April 18, 1939.                    G. S. NOBLE                    2,154,693
                                  CONTROL VALVE
                        Filed Feb. 19, 1937            3 Sheets-Sheet 1
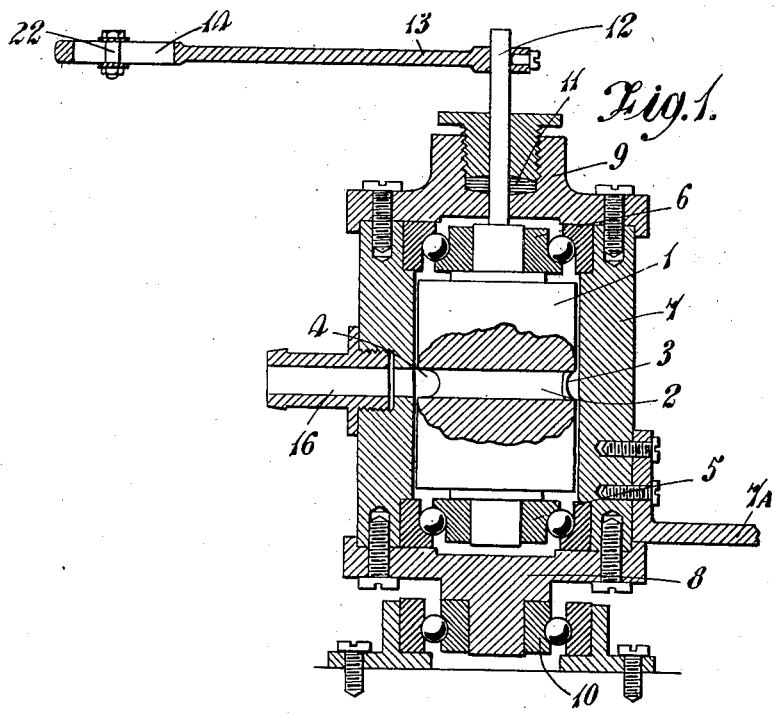
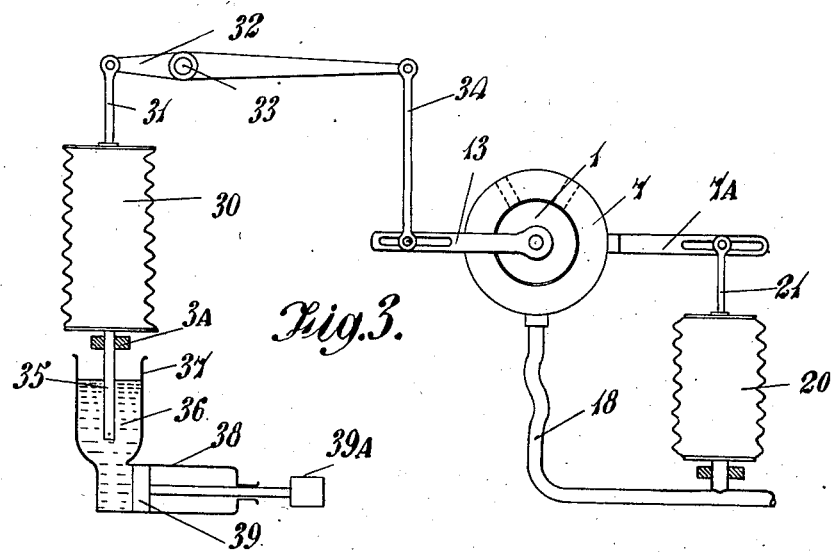
INVENTOR
G. S. Noble.
By Lacey & Lacey,
                Attys.

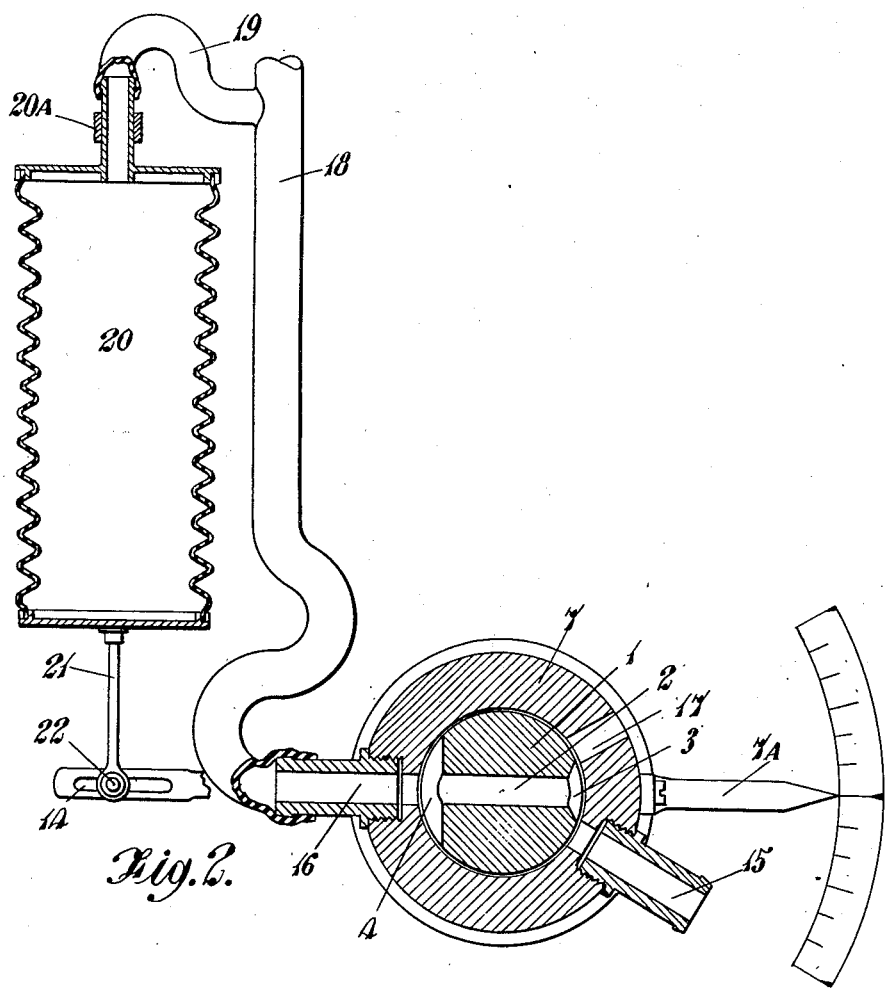

April 18, 1939.　　　G. S. NOBLE　　　2,154,693
CONTROL VALVE
Filed Feb. 19, 1937　　　3 Sheets-Sheet 3

INVENTOR
G. S. Noble.
By Lacey & Lacey,
Attys.

UNITED STATES PATENT OFFICE 2,154,693

CONTROL VALVE

George Saint Noble, Barcelona, Spain, assignor to Clair Saint Noble, London, England Application February 19, 1937, Serial No. 126,722
In Great Britain January 18, 1936

2 Claims. (Cl. 137—153)

This invention relates to the construction of valves and the application of valves for relay purposes, pressure reduction purposes, proportionating or like purposes in fluid systems, and also to relay control systems or like system in which means are provided whereby a force or movement of small order acting as an initiator, may control much larger force or movement. An example of the application of the invention is the maintenance of one part of a fluid system at a pressure which is predeterminately and adjustably different from or proportionate to the pressure in another part of the system. An object of the invention is the provision of a sensitive and accurate controlling means for pressure reduction or proportionating; it may, for example, be found desirable to control air pressure by a valve so that (coming from a source at a constant and relatively high pressure) it may be utilised as a relay initiated by a very small force. The device may be applied to systems of positive or negative pressure. In another application of the invention, it is believed that it may be applied in pneumatic inflating or analogous systems where it is desired to utilise air at an adjustable pressure capable of variation at choice although emanating at a source at a constant and higher pressure. Whilst the invention at present conceived is primarily applicable to gaseous systems it may also be found applicable in liquid systems. A further object of the invention is the provision of a control or control system in which, upon initiation of a larger force by a smaller force or movement, the larger force will be maintained with substantial accuracy or will be varied with substantial accuracy proportionately to the smaller force or movement. One of the immediate applications of this embodiment of the invention is to the automatic or partially automatic control of aircraft. The invention may, however, be found to have other general and commercial applications. In connection with brake and clutch control of motor vehicles it has been proposed to employ a follow-up pneumatic suction-control valve in the form of a ported fixed body, a ported sliding sleeve and a ported inner sliding cylinder, the sleeve being controlled in accordance with required suction and the cylinder, against a spring, by the output or resultant suction. In these prior cases the ports were arranged to put the output side into or out of communication with atmosphere as the alternative to putting that side out of or into communication respectively with the suction source.

The present invention, as demonstrated by experiment, permits, to an extraordinary high degree of accuracy, the selection and maintenance of any output pressure between that of the supply source and that of the escape and does so by providing that the output is at all times in simultaneous fluid communication with both the source of supply and the escape, the relative effective sizes of these communications being variable and very critically controlled by a pressure sensitive device. Where mention is made of size of communication, this refers not only to the open area of a port or the like, but takes into account any contributory fluid passage area, such as may be constituted by a clearance between, for example, a valve and its body.

According to the invention broadly stated, there is provided a fluid pressure valve comprising two parts each movable relatively to its surroundings and having cooperating ports connected respectively to the source of pressure, an output side, and an escape, the ports being adapted simultaneously to interconnect the said source, output and escape and by relative movement between the parts to vary the connection inversely as between source and escape, means for moving one of said parts in accordance with required pressure, means for moving the other part in accordance with the pressure in the output side, and resilient means resisting the moving effect of the pressure in the output side. The pressure responsive device, which is preferably a flexible metal box, positions the valve part to which it is connected in accordance with the pressure in the output side so that the second part can and does follow up the movements of the first part but with the progressive lag necessary to insure a progressive change in the ratio between the effective sizes of communication, between the output on the one hand and the source of supply and the escape on the other hand. This change in ratio is achieved and maintained by the pressure-sensitive device. The parts are preferably both rotatable, one in bearings between itself and its surroundings, and the other in bearings in the first. The parts are preferably both rotatable, one in bearings between itself and its surroundings, and the other in bearings in the first. The parts may be in the nature of a valve spindle in a hollow cylindrical body, or may be parts with cooperating flat and may be disc-like surfaces. The invention includes fluid pressure systems in which valves as above constituted are included, and various applications of such systems. Various adjustments are provided for, and the invention also includes matters of detail defined in the claims and made clear in the following description.

Figure 1 is a sectional elevation of one form of valve;

Figure 2 is a sectional plan of the same valve showing connections and a pressure sensitive device;

Figure 3 is a diagrammatic view of a layout using the same or a similar valve arranged somewhat differently; in the particular example it is for the purpose of elevator control in aircraft;

Figure 5:
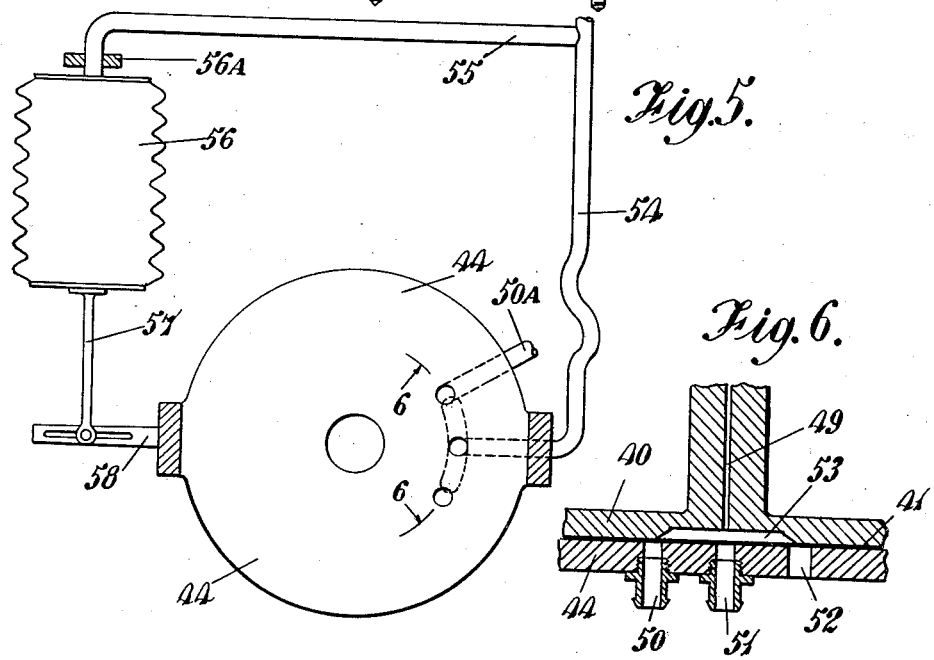

Figure 5 a diagram of the layout of the same; and

Figure 6:
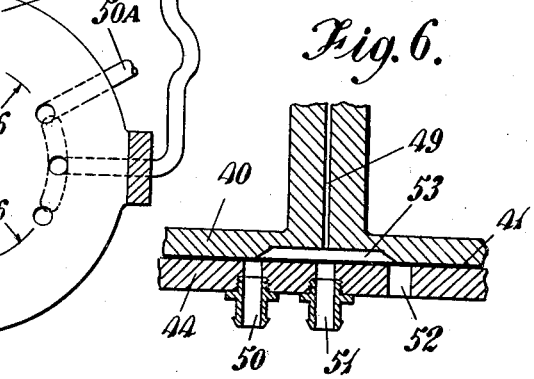

Figure 6 a section of a detail taken on the line 6—6 of Figure 5.

The valve of Figures 1 and 2 comprises a cylindrical spindle member 1 with a diametrical bore 2 enlarged at one end into a somewhat widened mouth 3 and at the other end into a relatively very wide mouth formed as a segment-like recess or flat 4. The spindle 1 is supported by a lower journal and thrust bearing at 5 and a like upper bearing at 6, and is thus borne in the valve body comprising a cylinder 7 and a bottom end wall 8 and an upper end wall 9. The wall 8 is furnished with a bearing 10 permitting free rotation of the valve body, and the wall 9 is furnished with a gland or packing 11 around a thin spindle 12 which is rigid with the spindle 1 and in coaxial continuation thereof. The spindle 12 has a lever 13 connected with it which is slotted at 14. The wall 7 has a lever 7A connected with it, which is in effect the controlling lever, pointer, or index of the system.

The wall 7 has three radial ports; port 15 is a connection from a source of pressure; port 16 is an output connection; and port 17 is an escape to atmosphere. Port 16 is so arranged that it constantly registers with the mouth 4 of port 2. Ports 15 and 17 are so arranged that either of them may be registered with mouth 3 of port 2, but they are spaced angularly so that there is always fluid communication between these two ports on the one hand and mouth 3 on the other hand. There is, therefore, one relative position between spindle 1 and the wall 7 in which the effective fluid communication between mouth 3 and port 15 would be equal to that between mouth 3 and port 17, any progressive relative movement between the spindle 1 and the valve body 7 in either direction causes a proportionate progressively changing ratio between the effective communication from mouth 3 to port 15 and from mouth 3 to port 17. In other words, relative movement of the spindle and the valve body tends to restrict the communication to one port, at the same time augmenting the communication to the other.

As distinct from relative size of the effective fluid communications inter se referred to above, the combined size of these two communications is determined by the designer to suit the speed of operation required of the device, the larger this combined size, i. e., the larger the overlap, the less will be the time lag in operation. A successful experimental valve of about ¼" diameter spindle was made with the size of the combined communications such that it consumed .1 cubic foot of free air per minute while maintaining 7½ pounds square inch output pressure from a 15 pound square inch source pressure, with an accuracy of the order of one-thousandth of one pound per square inch.

The fact that the spindle is rotatable in the valve body without any point of contact between the two except the anti-friction bearings is an added factor in achieving the high degree of accuracy in the maintenance of the predetermined pressure.

Figure 2 indicates how the valve spindle is controlled by the pressure sensitive device on the output side; the output port 16 communicates with the required receiver of pressure by the pipe 18 which has a branch 19 leading to the inside of a pressure sensitive device in this case shown as a flexible walled metal chamber 20 which is otherwise hermetically sealed. A spring or other resilience which may be adjustable as to its effect tends to contract the chamber 20 lengthwise. Assuming one end of it to be held, for example by a fitting or anchorage 20A, the other end, terminating in a rod 21, will be moved longitudinally in accordance with pressure variations in the output. The movements are communicated from the rod 21 by a pin 22 secured in the slot 14, to the arm 13. Thus pressure responsive movements of the chamber 20 are communicated to the spindle 1 and result in partial rotation thereof. The lever 7A is used to set the position or adjust the position of the valve body by direct rotation. Suppose for example, it is required to raise the pressure in the output pipe 18, the lever 7A and valve body would be rotated anticlockwise (in Figure 2), whereupon the effective communication between port 15 and mouth 3 is increased, and that between mouth 3 and port 17 decreased with a consequent rise of pressure in port 2 and therefore in the chamber 20, so that the rod 21 moves the lever 13 together with spindle 1 also anti-clockwise, i. e. following up the originated movement of the valve body 7, but progressively lagging behind in relation to this movement. This progressive lag is due to the need of an increasing effective communication between port 15 and mouth 3, and a decreasing one between mouth 3 and port 17, so as to keep step with the rising pressure in the output side. On the cessation of the movement of the lever 7A and, therefore, of the valve body 7, the movement of the spindle 1 under influence of the chamber 20 also ceases, and it will cease at a position in relation to the valve body 7 at which the effective communication between mouth 3 and port 15 will be larger than before the initiation of the movement of lever 7A, while the effective communication between mouth 3 and port 17 will be smaller, thus the pressure in port 2 will be higher than before the movement started and will be pressure required in chamber 20 to move the spindle in its follow up motion with sufficient lag behind the valve body 7, as to produce the new proportion between the effective communications referred to above. At this point there will be pressure equilibrium which will be maintained until a new movement of lever 7A is initiated.

If a sudden demand on the pipe 18 momentarily reduced the pressure in the output side, this would naturally be communicated to chamber 20 which would result in a movement of the spindle 1 in a clockwise direction, increasing the communication between mouth 3 and port 15, and decreasing that between mouth 3 and port 17, this would build up the pressure in the output side and chamber 20, to restore the position of the spindle and the pressure in the output side, to the same points they held before the disturbance.

Conversely, if the pressure in the pipe 18 should rise through any cause, the consequent rise of pressure in chamber 20 would produce an anticlockwise movement of the valve spindle 1, this movement decreasing the effective communication between mouth 3 and port 15 and increasing that between mouth 3 and port 17, thereby lowering the pressure in the output side and chamber 20 to restore the position of the spindle and the pressure in the output side to the same points they held before the disturbance.

The resilience or like restrain on the movements, induced by the chamber 20, determine the precise output pressure and the pin 22 in the slot 14 provides an adjustment which will control the sensitivity or relay ratio of the device. The clearance between the spindle 1 and the valve body 7 may form part of the effective communication between the mouth 3 on the one hand and ports 15 and 17 on the other.

If the movement of the lever 7A should be of so rapid a nature that the communication between the mouth 3 and one of the ports should be cut off (except for the clearance between spindle and valve body referred to before), this would not in any way affect the correct working of the device, as it would, in fact, help to increase or decrease, as the case may be, the pressure in the output side more rapidly until the conditions outlined above once more came into play toward the end of the movement in question.

Figure 3 shows a proposed embodiment of a valve identical with that of Figures 1 and 2, but arranged (for the sake of example) so that the body is controlled by the chamber 20 and the spindle by the initiating control. Similar parts have been similarly indicated where possible. It will be observed that the lever 7A (of the body 7) is in this case connected to the rod 21 of the chamber 20, whilst the lever 13 of the spindle 1 is similarly connected to the initiating control. The control consists in a second pressure sensitive device in the form of a metal box or capsule 30 anchored at 3A, having a push rod 31 connected to a lever 32 pivoted at 33 and connected by a rod or link 34 to the lever 13. The capsule 30 has a depending pipe 35 open at its lower end and at this end immersed in mercury 36 contained in a vessel 37 which is connected to a cylinder 38 in which operates an adjustable piston 39 with an adjusting knob 39A. If the piston 39 be pushed in, the level of the mercury 36 rises above the end of the pipe 35 and hermetically seals the capsule 30. The capsule 30 now becomes susceptible to variations of atmospheric pressure; it can thus act as a device sensitive to changes of height in an aircraft (or depth in a submarine if it be exposed to the water in which the submarine moves). The output pipe 18 is connected to any suitable servomotor actuated or initiated by the pressure controlled by the valve 1, 7, and consequently this embodiment of the invention is adapted for elevator or tailplane incidence control of an aeroplane. The pilot of an aeroplane thus controllable, having reached his desired height, sets the piston 39 so that the capsule 30 is sealed; the pressure within the capsule 30 now equals that of the atmosphere at that height, and thereafter changes of height will cause the spindle 1 to move and the desired control is effected. It is contemplated that the output 18 may be connected direct to a slave cylinder operating the elevator.

Figure 4:
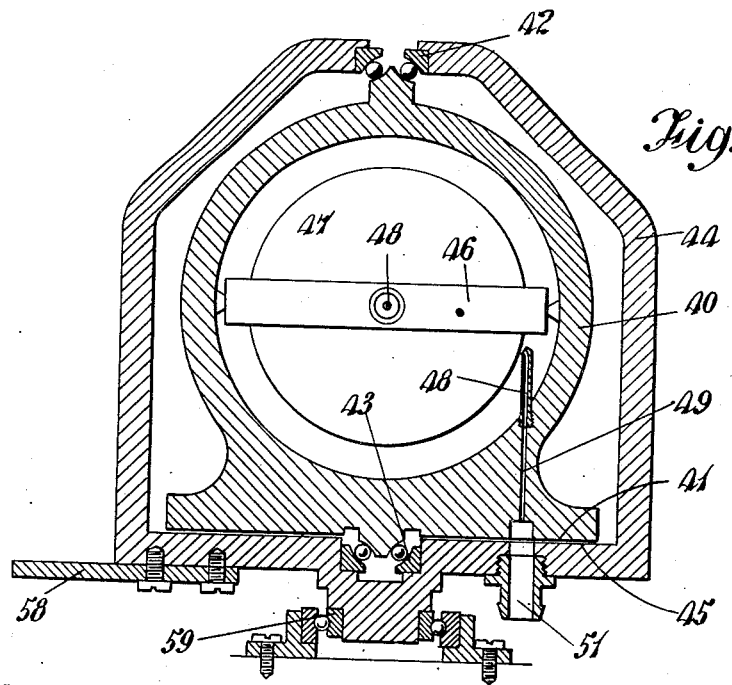
Figure 4 shows a variant of the valve adapted for use with a gyroscope control, in sectional elevation.

Turning now to Figures 4, 5 and 6, the adaptation of the invention is for directional or rudder control of an aircraft, gyroscopically. This example also shows a variation in the construction of the valve itself. The valve is again in two relatively rotatable parts rotatably mounted in their surroundings. The first part is in the form of an outer gimbal ring 40 with a flat disc-like bottom surface at 41, the gimbal 40 being carried in an upper bearing 42 and a lower bearing 43, in the other valve part, which comprises a housing (which may be a closed casing) 44, which has a flat surface 45 corresponding with the surface 41. The gimbal 40 carries an inner gimbal ring 46 in which is borne a gyro rotor 47 on the axis 48, in a manner which will be clear to those acquainted with gyroscopic instrument practice. The rotor 47 is spun by an air jet 48 fed by a duct 49 in the gimbal 40. In the floor of the housing 44 are the three ports, namely the pressure source port 50, the output port 51, and the atmosphere escape port 52. In the surface 41 is formed a port 53 which is at all times in registration with the port 51, the port 53 being so dimensioned that there is definite fluid communication simultaneously to both ports 50 and 52. The function of this port arrangement is so nearly identical with the function previously described as to require no further description. Figure 6 being a section on the arcuate line 6—6 of Figure 5, the relative disposition of the ports can readily be appreciated. Port 50 is connected by a pipe 50A to the pressure source, and port 51, by a pipe 54 to the pressure receiver, in this case a rudder servomotor or controlling device. The pipe 54 has a branch 55 leading to the pressure sensitive flexible box or chamber 56 which is anchored at 56A and operates the rod 57 which is connected to a lever 58 fixed to the housing 44. The housing 44 is carried by its surroundings in the bearing 59. It will be observed that the pressure source supplies the duct 49 for spinning the rotor 47. Assume the rotor 47 to be spinning and the whole device to be carried in an aircraft with the axis 48 substantially horizontal. If the aircraft deviates from its course, for example to the right or clockwise as seen from above, the gyro will practically maintain the original orientation of the gimbal 40. Thus in effect (referring to Figure 6) fluid communication from port 50 to port 53 will be increased while that from port 53 to port 52 will be decreased. Pressure in port 53 will consequently rise, this rise being transmitted via pipes 54, 55 to chamber 56 will cause the housing 44 to move in an anti-clockwise direction, so as to also maintain its original orientation except for the necessary lag to account for the increased pressure. The rise in pressure is proportionate to the deviation of the aircraft from its course, and this will move the rudder proportionately to combat the change of course. As the aircraft returns toward its original course, pressure in the pipe 54 will proportionately decrease, the pressure at all times being proportional to the deviation of the aircraft from its course. It need hardly be mentioned that a change of course to the left of the aircraft will have the converse effect of cutting down the pressure in the pipe 54 and producing opposite rudder movement and "follow up" in the opposite sense. A device such as this is intended to be adjusted so that when the aircraft is on its proper course, the pressure in 53, 54, 55 and 56 is, for example, half that of the source of supply. For example, if the source pressure be 15 lbs. per square inch, the steady pressure in 54 is arranged to be 7½ lbs., and this is maintained in straight flight. Deviation from course produces either a rise or a fall around that preselected figure, and the servomotor or rudder control is therefore arranged to be susceptible either to an increase or decrease of pressure; it may be a spring loaded single-acting piston in a cylinder.

What I claim is:—

1. A fluid pressure valve comprising two rotary parts, bearings for said parts whereby they are coaxially borne and each is relatively movable, cooperating radial ports in said parts connected respectively to a source of pressure, an output side and an escape, one of said ports having an enlarged mouth and being adapted to interconnect said source, the output and the escape for simultaneous flow through all three of these and by relative movement between said parts to vary the connection inversely as between source and escape, means for adjusting one of said valve parts selectively in accordance with the required pressure, means for moving the other part in accordance with the pressure in the output side, and resilient means resisting the moving effect of the pressure in the output side.

2. A fluid pressure two-part valve comprising a hollow body with three ports therein respectively connected to a source of pressure, an outlet side and an escape, a bearing for said body permitting its rotation, a spindle forming the other part coaxially mounted within the body, a port in said spindle to cooperate with said body in simultaneous connection with each of the ports in the body, bearings for said spindle permitting its rotation coaxially within said body, a pressure responsive device connected to said output side, a mechanical connection between said device and one of the two parts to rotate said part in response to pressure of the output side, resilient means resisting the moving effect of the pressure in the output side, and means for selectively rotating the other valve part, the ports of the body in connection to source and escape being angularly spaced so that the spindle port just interconnects said source and escape ports to provide a small leak while the third body port is so disposed as to register with the spindle port at all times in use.

GEORGE SAINT NOBLE.